(12) United States Patent
Wato (10) Patent No.: US 9,961,240 B2
(45) Date of Patent: May 1, 2018

(54) IN-VEHICLE CAMERA DEVICE AND IN-VEHICLE SYSTEM

(71) Applicant: DENSO CORPORATION, Kariya, Aichi-pref. (JP)

(72) Inventor: Koji Wato, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 240 days.

(21) Appl. No.: 14/918,301

(22) Filed: Oct. 20, 2015

(65) Prior Publication Data

US 2016/0119509 A1 Apr. 28, 2016

(30) Foreign Application Priority Data

Oct. 22, 2014 (JP) .................................. 2014-215644

(51) Int. Cl.
| | | |
|---|---|---|
| *H04N 5/225* | (2006.01) | |
| *G06T 7/00* | (2017.01) | |
| *G06K 9/00* | (2006.01) | |
| *B60Q 1/00* | (2006.01) | |
| *H04N 7/18* | (2006.01) | |
| *B60R 11/04* | (2006.01) | |
| *G03B 17/55* | (2006.01) | |
| *B60R 11/00* | (2006.01) | |

(52) U.S. Cl.
CPC .......... *H04N 5/2251* (2013.01); *B60R 11/04* (2013.01); *G03B 17/55* (2013.01); *G06K 9/00791* (2013.01); *H04N 5/2252* (2013.01); *H04N 5/2257* (2013.01); *B60R 2011/0026* (2013.01)

(58) Field of Classification Search
CPC .. H04N 5/2251; H04N 5/2252; H04N 5/2257; B60R 11/04; G03B 17/55; G06K 9/00791
USPC ......................................................... 348/148
See application file for complete search history.

(56) References Cited

U.S. PATENT DOCUMENTS

| | | | |
|---|---|---|---|
| 5,096,287 | A | 3/1992 | Kakinami et al. |
| 5,485,378 | A | 1/1996 | Franke et al. |
| 6,170,955 | B1 | 1/2001 | Campbell et al. |
| 6,811,330 | B1 | 11/2004 | Tozawa |
| 8,570,374 | B2 * | 10/2013 | Betham .................. B60R 11/04 348/148 |

(Continued)

FOREIGN PATENT DOCUMENTS

| | | |
|---|---|---|
| DE | 10237608 A1 | 2/2004 |
| EP | 1605729 A2 | 12/2005 |

(Continued)

*Primary Examiner* — Hee-Yong Kim
(74) *Attorney, Agent, or Firm* — Knobbe, Martens, Olson & Bear, LLP (57) ABSTRACT

A camera module captures an image of an area ahead of a vehicle. A control circuit board performs a recognition process to recognize conditions ahead of the vehicle, and performs at least two vehicle control processes from among a lane departure warning process, a headlight control process, and a forward collision avoidance process. A housing accommodates the camera module and the control circuit board. A bracket fixes the housing to the windshield of the vehicle, and has an opening permitting the housing and the windshield to face each other in a state where the housing is fixed to the windshield via the bracket. A hood covers the camera module. A first thermally conductive member is provided being in contact with the housing and the windshield in the opening formed on the bracket.

17 Claims, 7 Drawing Sheets

(56) References Cited

U.S. PATENT DOCUMENTS

| | | | |
|---|---|---|---|
| 2003/0025597 A1* | 2/2003 | Schofield | B60Q 1/346 340/435 |
| 2003/0059218 A1 | 3/2003 | Sakata et al. | |
| 2004/0032668 A1 | 2/2004 | Schaefer et al. | |
| 2005/0001901 A1 | 1/2005 | Eggers et al. | |
| 2007/0041725 A1 | 2/2007 | Neumann et al. | |
| 2010/0152964 A1 | 6/2010 | Hashimoto et al. | |
| 2010/0219173 A1 | 9/2010 | Gruber | |
| 2010/0318258 A1 | 12/2010 | Katayama et al. | |
| 2012/0119104 A1 | 5/2012 | Arslan et al. | |
| 2014/0178635 A1 | 6/2014 | Imaizumi et al. | |
| 2015/0042804 A1* | 2/2015 | Okuda | B60R 11/04 348/148 |

FOREIGN PATENT DOCUMENTS

| | | |
|---|---|---|
| JP | H04-286280 A | 10/1992 |
| JP | H11-069211 A | 3/1999 |
| JP | 2001-088611 A | 4/2001 |
| JP | 2001-088623 A | 4/2001 |
| JP | 2002-504453 A | 2/2002 |
| JP | 2002-341432 A | 11/2002 |
| JP | 2002-374441 A | 12/2002 |
| JP | 2003-300414 A | 10/2003 |
| JP | 2004-025930 A | 1/2004 |
| JP | 2004-112329 A | 4/2004 |
| JP | 2005-022643 A | 1/2005 |
| JP | 2005-341522 A | 12/2005 |
| JP | 2007-011908 A | 1/2007 |
| JP | 2007-015457 A | 1/2007 |
| JP | 2008-500926 A | 1/2008 |
| JP | 2008-024194 A | 2/2008 |
| JP | 2010-534588 A | 11/2010 |
| JP | 2013-500900 A | 1/2013 |
| JP | 2013-099945 A | 5/2013 |
| JP | 2014-101004 A | 6/2014 |
| WO | 2007/000941 A1 | 4/2007 |

* cited by examiner

IN-VEHICLE CAMERA DEVICE AND IN-VEHICLE SYSTEM

CROSS-REFERENCE TO RELATED APPLICATION

This application is based on and claims the benefit of priority from earlier Japanese Patent Application No. 2014-215644 filed in Japan on Oct. 22, 2014, the description of which is incorporated herein by reference.

BACKGROUND

Technical Field

The present invention relates to an in-vehicle camera device.

Related Art

There is known a technique with which a camera device is mounted to the inner side of a vehicle windshield to recognize a person, a vehicle, or the like present in an area ahead of the vehicle on the basis of an image captured by the camera device. This type of a camera device tends to have a high temperature under strong sunlight, for example, and the temperature can exceed an operating temperature limit of the camera device. As a measure against this, a patent literature JP-A-2003-300414 proposes a camera device having a housing whose surface is provided with an infrared reflective member. With this configuration, infrared rays included in the sunlight are reflected off the infrared reflective member to minimize temperature rise of the camera device.

In the camera device described in the above patent literature JP-A-2003-300414, temperature rise of the camera device is minimized by reflecting the infrared rays. With this measure, however, the camera device itself is not cooled. Therefore, if the temperature rises in the camera device for some reason, prompt lowering of the temperature is difficult. On the other hand, when the temperature of the environment external to the vehicle is low (e.g. in winter), the camera device of this type causes fogging in a portion of the windshield in front of the camera device, creating problems in capturing an image.

SUMMARY

The present invention has as its object to provide a camera device which is able to accelerate cooling of a camera device mounted to the inner side of a vehicle windshield and minimize fogging of a portion of the windshield in front of the camera device.

An aspect of the present invention is an in-vehicle camera device including a camera module, a control circuit board, a housing, a bracket, a hood, and a first thermally conductive member. The camera module picks up an image of an area ahead of the vehicle. The control circuit board performs a recognition process to recognize conditions ahead of the vehicle on the basis of an image captured by the camera module, and performs at least two vehicle control processes from among a lane departure warning process, a headlight control process, and a forward collision avoidance process on the basis of the result of the recognition process. The housing accommodates the camera module and the control circuit board. The bracket fixes the housing to the windshield of the vehicle, and has an opening permitting the housing and the windshield to face each other in a state where the housing is fixed to the windshield via the bracket. The hood covers the camera module. The first thermally conductive member is provided being in contact with the housing and the windshield in the opening formed in the bracket.

With this configuration, fogging of a portion of the windshield in front of the camera device can be minimized, while cooling of the camera device is accelerated.

DETAILED DESCRIPTION OF THE PREFERRED EMBODIMENTS

With reference to the accompanying drawings, an exemplary embodiment of the present invention will be described. Reference numerals and signs used in the following description of the embodiment are appropriately used in the claims as well. The reference numerals and signs are used for easy understanding of the present invention, and should not be construed as limiting the technical scope of the present invention.

1. Configuration

Figure 1:
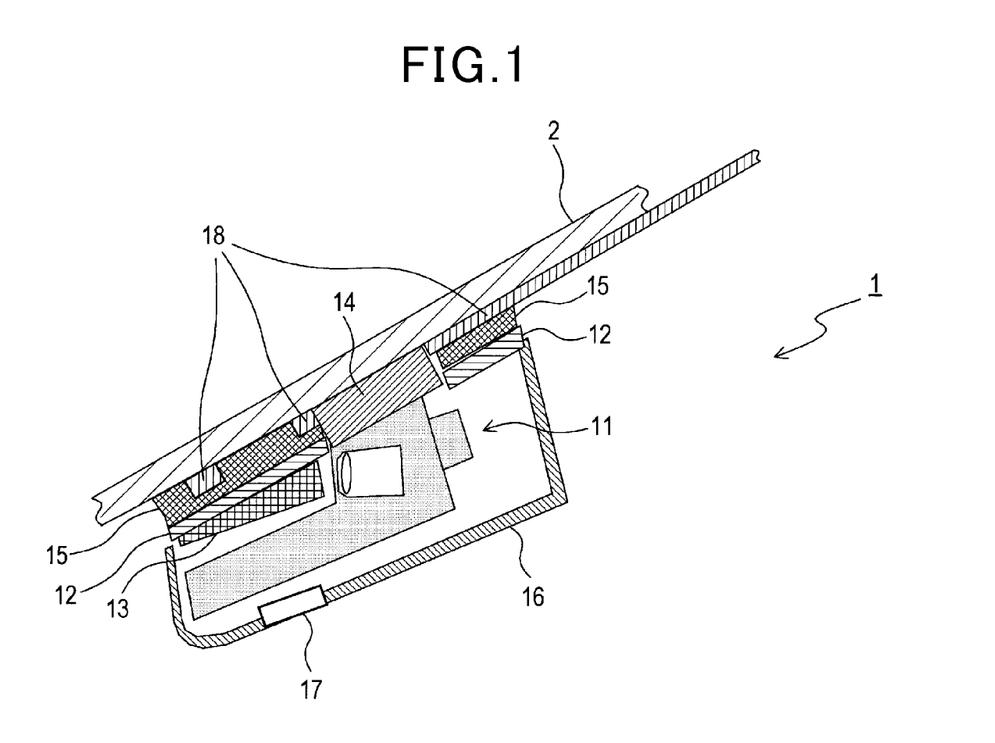
FIG. 1 is a cross sectional view illustrating a camera device.
Figure 2:
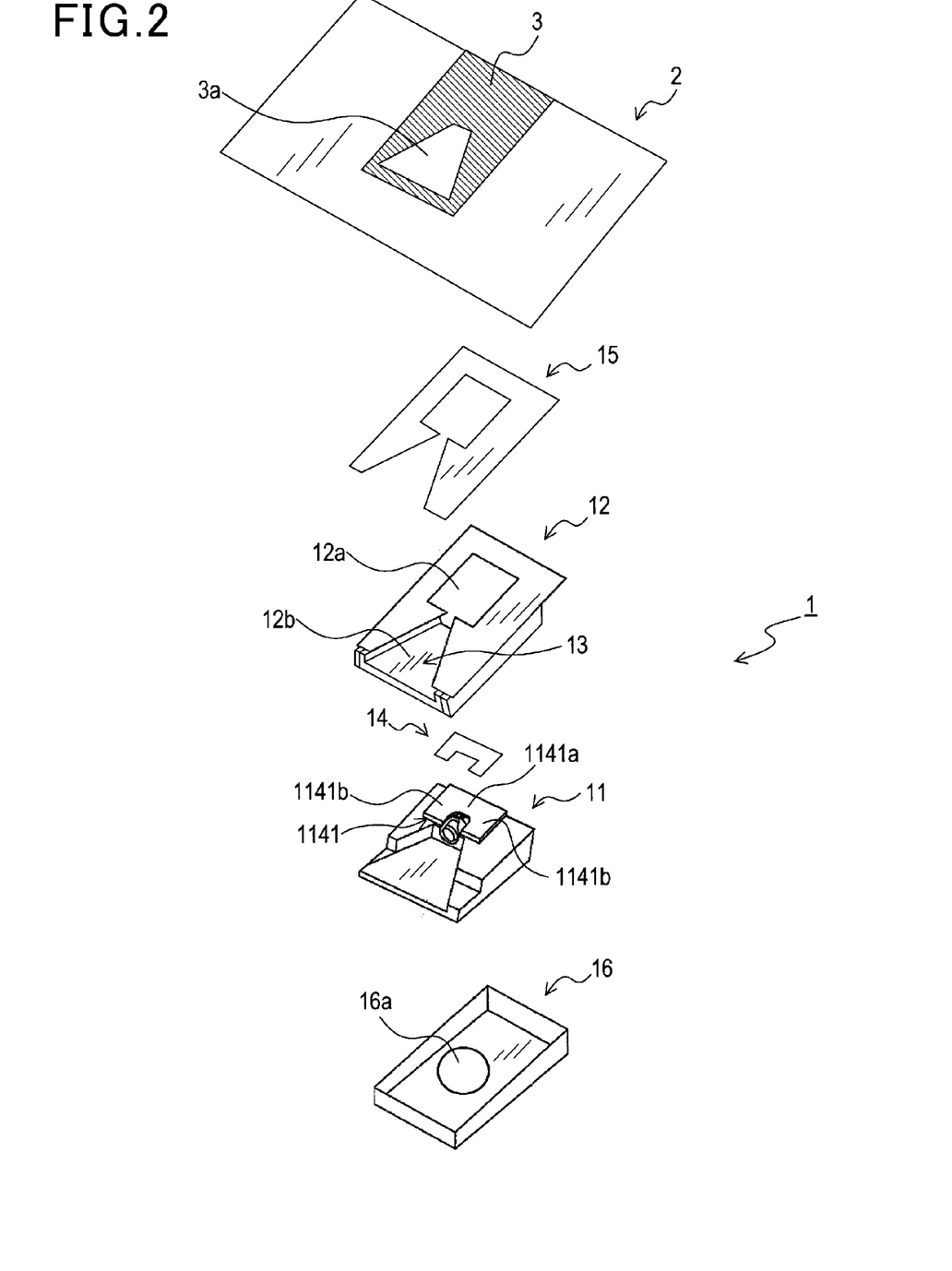
FIG. 2 is an exploded perspective view illustrating the camera device.

A camera device 1 illustrated in FIGS. 1 and 2 is mounted to a windshield 2 of a vehicle from inside (from the car compartment side), so as to be located at the center on the upper part of the windshield 2 (near a rearview mirror). The camera device 1 includes an image sensor 11, a bracket 12, a hood 13, a first thermally conductive member 14, a second thermally conductive member 15, a cover 16, a ventilation fan 17, and a hot wire 18. In FIGS. 1 and 2, a part of the windshield 2 is illustrated, and in FIG. 2, the ventilation fan 17 and the hot wire 18 are omitted for the sake of clarity. In the following description, a vehicle to which the camera device 1 is mounted is referred to as an own vehicle.

Figure 3:
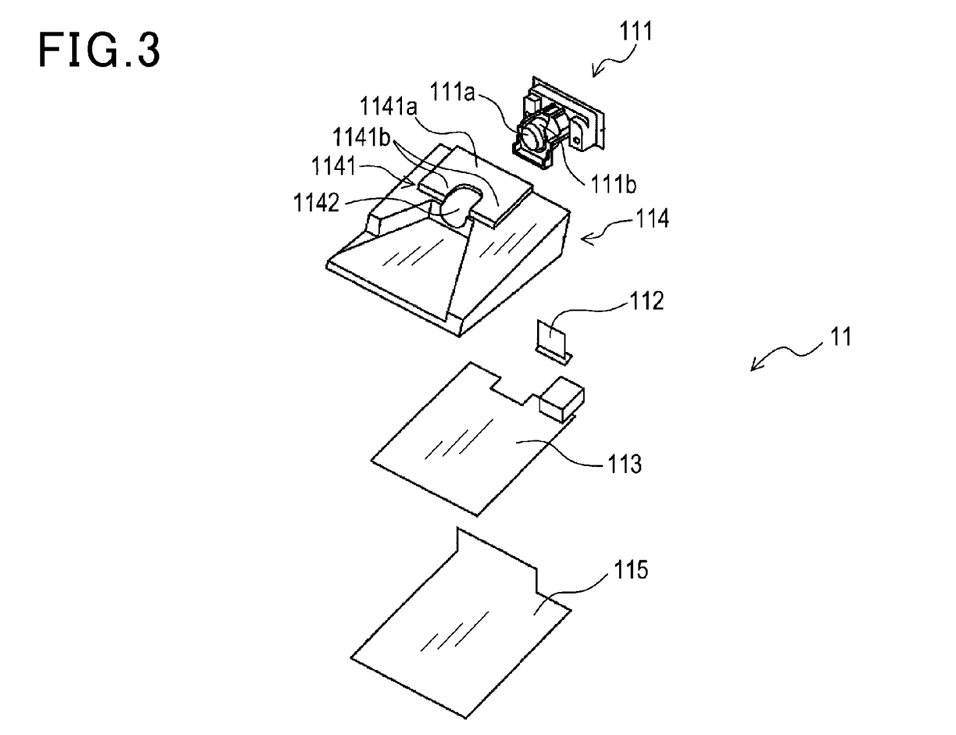
FIG. 3 is an exploded perspective view illustrating an image sensor.

As illustrated in FIG. 3, the image sensor 11 includes a camera module 111, an electrical connection wiring 112, a control circuit board 113, a housing 114, and a lower cover 115.

The camera module 111 includes a lens 111a and a lens barrel 111b and captures an image of an area ahead of the own vehicle. The lens barrel 111b is a cylindrical portion, with the lens 111a being held inside.

The electrical connection wiring 112 electrically connects the camera module 111 to the control circuit board 113.

The control circuit board 113 in a plate shape has a known microcomputer including a CPU, a ROM, and a RAM to perform a recognition process for recognizing conditions ahead of the own vehicle on the basis of an image captured by the camera module 111. The control circuit board 113 performs vehicle control processes that control devices installed in the own vehicle on the basis of the result of the recognition process. The recognition targets to be recognized in the recognition process and the processing of the vehicle control processes will be described later.

The housing 114 has side walls and an upper wall, with its lower end being open. The housing 114 accommodates the camera module 111, the electrical connection wiring 112, and the control circuit board 113 to cover these components from above. The housing 114 has a glass side wall 1141 formed with a cut 1142 that exposes the lens barrel 111b of the camera module 111 to the windshield 2. The glass side wall 1141 is a part of the upper wall of the housing 114 located on the windshield 2 side relative to the camera module 111 inside the housing 114, in a state where the housing 114 is fixed to the windshield 2 via a bracket 12 by a method described later.

The lower cover 115 closes the from below the housing 114.

On the other hand, the bracket 12 illustrated in FIGS. 1 and 2 is a resin member nearly in a plate shape. The bracket 12 has a center part in which an opening 12a is formed, and has a region surrounding the opening 12a in which a notch 12b is formed which is a cut imparting the bracket 12 with a U-shape. The bracket 12 is a member that fixes the housing 114 of the image sensor 11 to the windshield 2. Specifically, the bracket 12 has surfaces perpendicular to the thickness direction, one of which is fixed to the windshield 2 (in this example, adhered). The housing 114 is assembled to the fixed bracket 12. In a state where the housing 114 is fixed to the windshield 2 via the bracket 12, the housing 114 faces the windshield 2 because the opening 12a is formed in the bracket 12. The term face referred to herein means that the housing 114 faces the windshield 2 in a state where no member is present between the housing 114 and the windshield 2. The notch 12b of the bracket 12 is located in front of the camera module 111 exposed from the housing 114. The notch 12b is formed in a trapezoid in which the width is widened toward the forward area in the imaging direction of the camera module 111 to match the angle of view of the camera module 111. Thus, the field of view of the camera module 111 is ensured.

The hood 13, which is made of resin, has a trapezoid bottom face and two side faces erected on two sides other than the base of the trapezoid bottom face. The hood 13 is used being fit into the notch 12b of the bracket 12. In the present embodiment, it is so configured that the hood 13 is fit into the bracket 12, the housing 114 is assembled to the bracket 12, and the hood 13 covers the lens barrel 111b of the camera module 111. The hood 13 is disposed in such a manner that the bottom face of the hood 13 is located below the lens barrel 111b of the camera module 111. With the hood 13 being disposed in this way, the lens 111a has few reflections of the surroundings outside the angle of view of the camera module 111.

The first thermally conductive member 14 in a sheet shape is made of silicon and has a coefficient of thermal conductivity of not less than 1 W/m·K but not more than 50 W/m·K. The first thermally conductive member 14 has adhesion properties and thus is adhered to an object brought into contact with the member 14. The first thermally conductive member 14 is provided being in contact with the housing 114 and the windshield 2 in the opening 12a formed in the bracket 12. In the present embodiment, the first thermally conductive member 14 is firstly attached and adhered to the glass side wall 1141 of the housing 114, and then the housing 114 is fixed to the windshield 2 via the bracket 12. Thus, the first thermally conductive member 14 is in intimate contact and adhesion with the windshield 2. The first thermally conductive member 14 has a size and shape similar to the top face of the glass side wall 1141 of the housing 114. Therefore, the first thermally conductive member 14 is in contact with a region 1141a which is located on the rear of the cut 1142 of the glass side wall 1141 in the imaging direction of the camera module 111. The first thermally conductive member 14 is also in contact with regions 1141b located on both sides of the region 1141a to sandwich the cut 1142 of the glass side wall 1141.

The second thermally conductive member 15 in a sheet shape is formed of the same material as that of the first thermally conductive member 14. The second thermally conductive member 15 is located between the bracket 12 and the windshield 2 and in contact with the bracket 12 and the windshield 2. In the present embodiment, the second thermally conductive member 15 has a size and shape similar to the top face of the bracket 12 and is attached to the entire top face of the bracket 12. The second thermally conductive member 15 is fixed to the bracket 12 and the windshield 2 using an adhesive. In the present embodiment, to make the adhesive invisible from outside the own vehicle, the adhesive fixing the second thermally conductive member 15 to the windshield 2, the second thermally conductive member 15 is mounted on the windshield 2 via a black ceramic 3. The black ceramic 3 is formed with a trapezoid notch 3a corresponding to the angle of view of the camera module 111 in order not to block the field of view of the camera module 111.

The cover 16 has side faces and a lower face, with an upper part being open, and covers the image sensor 11, the bracket 12, and the hood 13 from below to make these components invisible from inside the own vehicle. In the present embodiment, the cover 16 is formed with a through hole 16a in the lower face thereof.

The ventilation fan 17 ventilates the interior of the cover 16, and is fixed to the cover 16 in a state of being fit into the through hole 16a formed in the cover 16.

Figure 4:
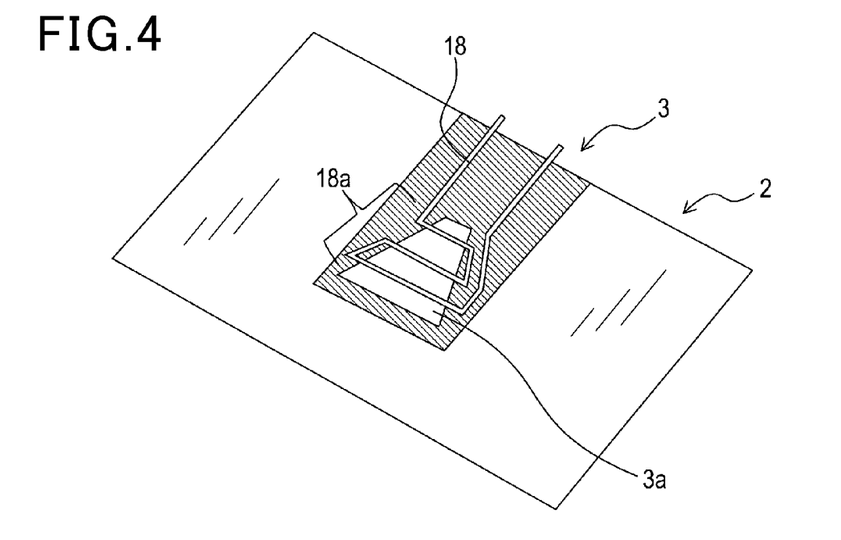
FIG. 4 is a diagram illustrating a method of routing a hot wire.

The hot wire 18 heats a portion of the windshield 2 in front of the lens 111a of the camera module 111. In the present embodiment, the hot wire 18 is a copper wire, with its both ends being connected to a power supply, not illustrated, arranged in the own vehicle. The hot wire 18 generates heat when current is passed therethrough. As illustrated in FIG. 4, the hot wire 18 is routed on the surfaces of the windshield 2 and the black ceramic 3 inside the car compartment. Specifically, the hot wire 18 has an S-shape portion 18a bent in an S-shape which is laid over the notch 3a of the black ceramic 3. More specifically, the hot wire 18 is disposed so as to cross the notch 3a a plurality of times perpendicularly to the height direction of the trapezoid notch 3a.

Figure 5:
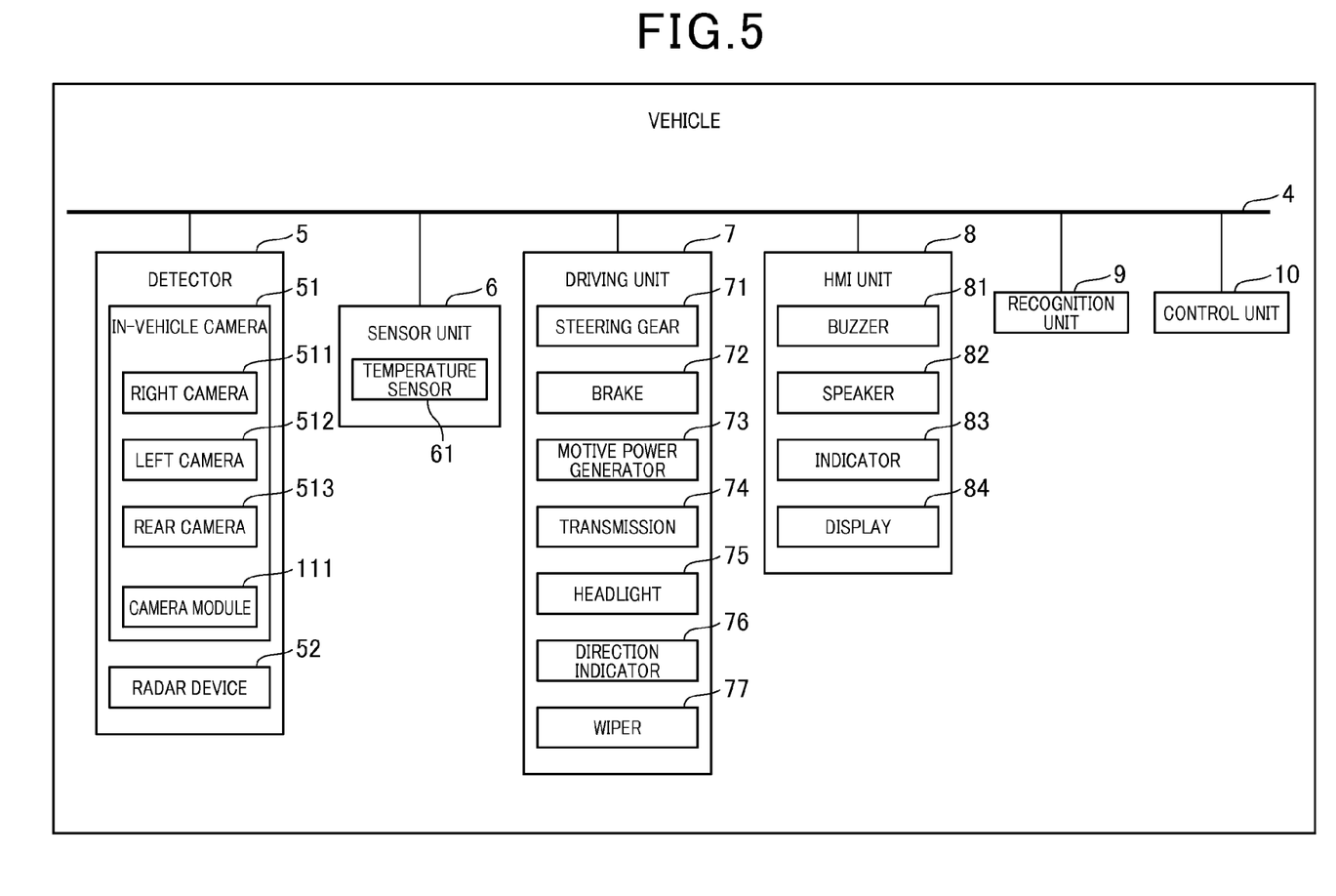
FIG. 5 is a block diagram illustrating an electrical configuration of a vehicle.

With reference to FIG. 5, electrical functions of the camera device 1 will be described. In FIG. 5, the bracket 12, the hood 13, and other components that do not have electrical functions are omitted from the configuration of the camera device 1. The own vehicle includes a detector 5, a sensor unit 6, a driving unit 7, a human machine interface unit (hereinafter referred to as HMI unit) 8, a recognition unit 9, and a control unit 10 connected to a common bus 4.

The detector 5 includes an in-vehicle camera 51 and a radar device 52 used for detecting the surroundings of the own vehicle. The in-vehicle camera 51 includes a right camera 511, a left camera 512, a rear camera 513, and the camera module 111 described above. The right camera 511 is mounted to a right sideview mirror of the own vehicle to capture an image on the right side of the own vehicle. The left camera 512 is mounted to a left sideview mirror of the own vehicle to capture an image on the left side of the own vehicle. The rear camera 513 is mounted to a rear bumper on the rear of the own vehicle to capture an image behind the own vehicle.

The radar device 52 is a known device that transmits and receives radar waves in a millimeter wave band or radar waves of laser light to detect an object present in a predetermined search range and reflecting radar waves. The radar device 52 generates target information including at least one of a distance from the vehicle, a velocity relative to the vehicle, and lateral location relative to the vehicle, and sends the information to the recognition unit 9, described later. The radar device 52 may be a sonar (not illustrated) that emits ultrasonic waves to detect an object using the waves reflected from an object in a predetermined direction.

The sensor unit 6 includes a temperature sensor 61 that detects the states of the devices mounted to the own vehicle. The temperature sensor 61 is located near the camera module 111 to detect the temperature of the camera module 111.

The driving unit 7 includes controlled objects as devices of the body system, power train system, and chassis system of the own vehicle. The controlled objects as such devices include: a steering gear 71 that changes the traveling direction of the vehicle; a brake 72 that decelerates the vehicle and regenerates energy; a motive power generator 73 composed of an engine or a motor to drive the vehicle; a transmission 74 that converts rotation to torque, or vice versa, to transmit motive power; a headlight 75; a direction indicator 76 that signals traveling direction change or right/left turn; and a wiper 77 that removes attachments to the windshield, such as rain drops, snow or dirt, causing poor visibility.

The HMI unit 8 includes devices that provide interfaces for communication between a human and the vehicle system. The devices providing interfaces include a buzzer 81, a speaker 82, an indicator 83, and a display 84, such as a navigation display provided in a center console or a head-up display provided on the center console. The HMI unit 8 may include an exciter (not illustrated) configured of an electric motor or the like to vibrate a steering or a seat, and may include a reaction force generator (not illustrated) that generates reaction force on a steering or a brake pedal. By operating these devices, information can be transferred from the vehicle system to a human. Further, The HMI unit 8 may include a sensitivity regulator that regulates the sensitivity (levels of ease of recognition) in a recognition process or the processing timing of a determination process performed in the recognition unit 9 or the control unit 10, described later, for sending information from a human to the vehicle system.

The recognition unit 9 is a part of a circuit mounted on the control circuit board 113, and performs the recognition process for recognizing the surroundings of the own vehicle on the basis of an image captured by the in-vehicle camera 51 and the detected result of the radar device 52. In the following description, the recognition process based on an image captured by the camera module 111 of the in-vehicle camera 51 is referred to as first recognition process, and the recognition process based on the detection result of the radar device 52 is referred to as second recognition process. In the present embodiment, the recognition unit 9 recognizes, through these recognition processes, lanes, road shapes, road conditions, light sources, preceding vehicles, oncoming vehicles, stationary vehicles, preceding pedestrians, oncoming pedestrians, stationary persons, motorcycles, bicycles, obstacles, roadside objects, signs, traffic signals, traffic signs, signboards, tunnels, escape areas, objects that block the field of view of the camera module 111, meteorological environments, and buildings.

The road shapes refer to the curvature and gradient of a road, and the road conditions refer to, for example, the conditions of a road surface which easily reflects light due to rain, snow or the like. The light sources include, for example, the taillights of a preceding vehicle and the headlights of an oncoming vehicle. The preceding pedestrians refer to those pedestrians who walk in a direction coinciding with the traveling direction of the own vehicle. The oncoming pedestrians refer to those pedestrians who walk ahead of the own vehicle in a direction opposite to the traveling direction of the own vehicle. The stationary persons refer to those persons who are stationary. The obstacles include rocks, for example. The roadside objects include, for example, utility poles and roadside obstacles, such as curbs, guardrails, poles, trees, fences, buildings, parked vehicles, and parked two-wheel vehicles. The escape areas refer to areas, for example, provided on a roadside to avoid a vehicle approaching from behind. The objects that block the field of view of the camera module 111 include, for example, dirt attached to a portion of the windshield 2 in front of the lens 111a of the camera module 111 or attached to the lens 111a, or adhered sheets, such as paper sheets, adhered to the above-mentioned portion of the windshield 2 above. The meteorological environments include, for example, rain, snow, fog, or backlight.

A lane is recognized by recognizing the positions of white lines on the road. The positions of white lines are recognized by a known white line recognition process using an image captured by the camera module 111 (e.g. white line recognition process using image binarization and Hough transform). A light source is recognized by sequentially performing known recognition processing steps with respect to an image captured by the camera module 111. Specifically, the recognition unit 9 recognizes an object having a luminance of a predetermined value or greater, a shape close to a predetermined shape, a color close to a predetermined color, or the like, as a light source among objects in a captured image, and identifies the position coordinates in the captured image. For example, the recognition unit 9 recognizes that the light source is the taillight of a preceding vehicle or the light source is the headlight of an oncoming vehicle. For example, the recognition unit 9 recognizes that the light source is the taillight of a preceding vehicle when the color of the light source is close to red in a predetermined range, and that the light source is the headlight of an oncoming vehicle when the color of the light source is close to white in a predetermined range.

The control unit 10 is a part of a circuit mounted on the control circuit board 113, and performs vehicle control processes in accordance with the recognition results of the recognition unit 9. In the present embodiment, the control unit 10 performs vehicle control processes including a lane departure warning process, a lane keeping process, a headlight control process, a crossing collision avoidance process, an intersection collision avoidance process, a forward collision avoidance process, a sign display process, a speed limit display process, an overspeed warning process, an automatic wiper process, a lane change assist process, an around view display process, an automatic parking process, an full-speed adaptive cruise control process, a blind spot warning process, a rear cross traffic warning process, a forward cross traffic warning process, an inter-vehicle distance warning process, a rear-end collision warning process, and an erroneous start prevention process.

In the lane departure warning process referred to herein, the control unit 10 makes a determination on lane departure, and causes the buzzer 81 and the speaker 82 to emit a voice-output warning to an occupant of the own vehicle, according to the result of the lane departure determination. With the lane departure determination, it is determined whether or not the own vehicle is likely to depart from the lane or whether or not the own vehicle has departed from the lane. The lane departure warning process is performed on the basis of a recognition result associated with a lane, a road shape, and the like.

In the lane keeping process, the steering gear 71 is controlled to prevent the own vehicle from departing from the lane, on the basis of the recognition result associated with a lane, a road shape, and the like.

In the headlight control process, the headlight 75 of the own vehicle is controlled so as to be switched between high beam and low beam, or the optical axis direction of the headlight 75 is swiveled. The headlight control process is performed on the basis of the recognition result associated with a lane, road shape, road conditions, light sources, and the like.

In the crossing collision avoidance process, the controlled objects, such as the steering gear 71 and the brake 72, involved in driving the own vehicle are controlled to avoid a collision, when the own vehicle is likely to collide with a vehicle or the like crossing the road ahead of the own vehicle on the near side of the intersection. In the intersection collision avoidance process, the controlled objects, such as the steering gear 71 and the brake 72, involved in driving the own vehicle are controlled to avoid a collision, when the own vehicle is likely to collide with a pedestrian, a vehicle, or the like in making a turn at an intersection. In the forward collision avoidance process, the controlled objects, such as the steering gear 71 and the brake 72, involved in driving the own vehicle are controlled to avoid a collision, when the own vehicle is likely to collide with a preceding vehicle or the like. The crossing collision avoidance process, the intersection collision avoidance process, and the forward collision avoidance process include a process of causing the buzzer 81 and the speaker 82 to emit a voice-output warning when a signboard or a tunnel is recognized and the own vehicle cannot pass under the signboard or go through the tunnel. The crossing collision avoidance process and the intersection collision avoidance process are performed on the basis of the recognition result of road conditions, preceding vehicles, preceding vehicles, oncoming vehicles, stationary vehicles, preceding pedestrians, oncoming pedestrians, stationary persons, motorcycles, bicycles, obstacles, roadside objects, signboards, tunnels, and the like. The forward collision avoidance process is performed on the basis of the recognition result of escape areas, in addition to the recognition result used in performing the crossing collision avoidance process and the intersection collision avoidance process.

In the sign display process, the display 84 is permitted to display thereon the instructions of signs, traffic signals, traffic signs, or signboards. The sign display process is performed on the basis of the recognition result associated with signs, traffic signals, traffic signs, signboards, or the like. In the speed limit display process, the display 84 is permitted to display thereon the speed limits indicated on signs. The speed limit display process is performed on the basis of the recognition result of signs or the like.

In the overspeed warning process, the buzzer 81 and the speaker 82 are permitted to emit a voice-output warning to an occupant of the own vehicle when the speed of the own vehicle exceeds a speed limit. The overspeed warning process is performed on the basis of the recognition result of signs or the like.

In the automatic wiper process, the operation of the wiper 77 is controlled in response to rainfall the like. The automatic wiper process is performed by determining the state of lowering visibility on the basis of the recognition result of the road conditions, meteorological environments, or the like.

In the lane change assist process, the steering gear 71, the brake 72, the transmission 74, and the direction indicator 76 are controlled to assist the driver to change lane. For example, in the lane change assist, a vehicle running on the adjacent lane is detected to give a warning to the driver of the own vehicle when changing lane. In the around view display process, the display 84 is permitted to display the captured images of all the surroundings of the own vehicle. In the automatic parking process, the steering gear 71 and the brake 72 are controlled to automatically park the vehicle. In the full-speed adaptive cruise control process, the brake 72, the motive power generator 73, and the transmission 74 are controlled so that the own vehicle can travel following a preceding vehicle. The lane change assist process, the around view display process, the automatic parking process, and the full-speed adaptive cruise control process are performed on the basis of the following recognition result. In other words, these processes are performed on the basis of the recognition results of lanes, road shapes, preceding vehicles, oncoming vehicles, stationary vehicles, preceding pedestrians, oncoming pedestrians, stationary persons, motorcycles, bicycles, obstacles, roadside objects, signs, traffic signals, traffic signs, and the like.

In the blind spot warning process, the buzzer 81 and the speaker 82 are permitted to emit a voice-output sound to attract the driver's attention when a vehicle or the like enters an area obliquely behind the own vehicle in a run, the area corresponding to a blind spot of the own vehicle. In the rear cross traffic warning process, the buzzer 81 and the speaker 82 are permitted to emit a voice output-sound to attract the driver's attention when a vehicle or the like enters an area obliquely behind the own vehicle in a backward movement in a parking lot or the like, the area corresponding to a blind spot of the own vehicle. In the forward cross traffic warning process, the buzzer 81 and the speaker 82 are permitted to emit a voice-output sound to attract the driver's attention when a vehicle or the like is present in a blind spot ahead of the own vehicle in an intersection or the like of poor visibility. The blind spot warning process, the rear cross traffic warning process, and the forward cross traffic warning process are performed on the basis of the following recognition results. In other words, these processes are performed on the basis of the recognition results associated with preceding vehicles, oncoming vehicles, stationary vehicles, preceding pedestrians, oncoming pedestrians, stationary persons, motorcycles, bicycles, obstacles, roadside objects, signs, traffic signals, traffic signs, and the like.

In the inter-vehicle distance warning process, the buzzer 81 and the speaker 82 are permitted to emit a voice-output sound to attract the driver's attention when the inter-vehicle distance to a preceding vehicle becomes shorter than a predetermined warning distance. In the rear-end collision warning process, the buzzer 81 and the speaker 82 are permitted to emit a voice-output sound to attract the driver's attention when the vehicle is likely to collide with a preceding vehicle. The inter-vehicle distance warning process and the rear-end collision warning process are performed on the basis of the recognition result associated with a preceding vehicle. In the erroneous start prevention process, the brake 72 is operated when the accelerator is pressed despite the presence of a building in front of the own vehicle in a stopped state of the vehicle. The erroneous start prevention process is performed on the basis of the recognition result associated with buildings.

When an object that blocks the field of view of the camera module 111 is recognized in the vehicle control processes, the control unit 10 stops at least a part of control performed in the vehicle control processes, and in particular, stops controlling the controlled objects, such as the steering gear 71 and the brake 72, involved in driving the own vehicle. When a meteorological environment, such as a heavy downpour, is recognized in which it is difficult for the camera module 111 to perform image recognition in the vehicle control processes, the control unit 10 also stops at least a part of control to be performed in the vehicle control processes.

The control unit 10 performs the switching process (FIG. 6), described later, to switch the first recognition process based on an image captured by the camera module 111, to the second recognition process based on the detected result of the radar device 52, or vice versa.

2. Switching Process

Figure 6:
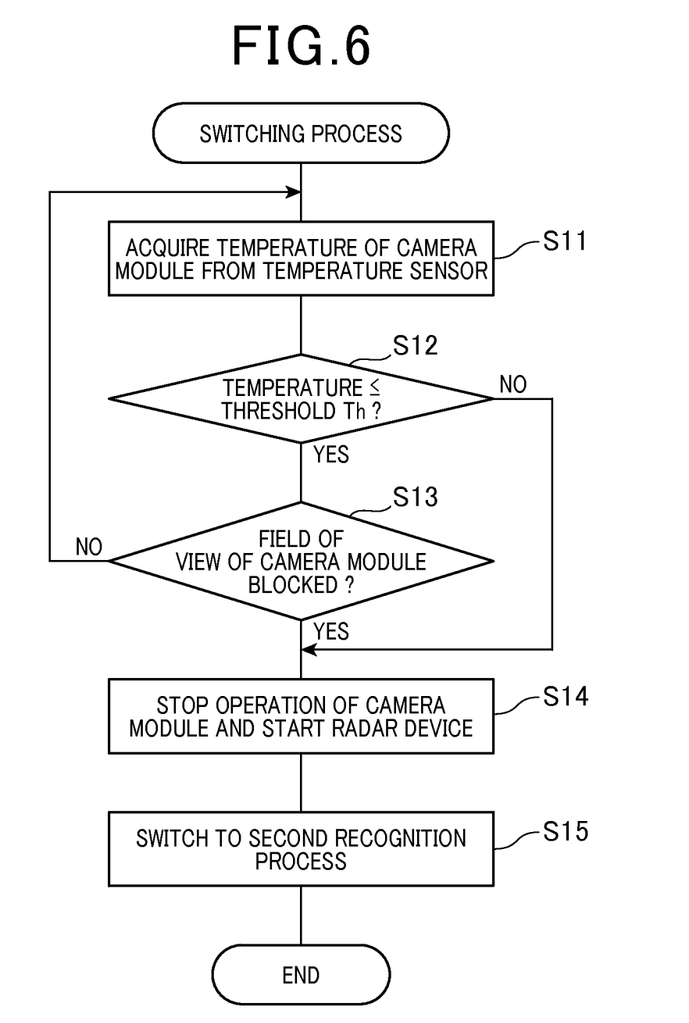
FIG. 6 is a flowchart illustrating a switching process.

With reference to a flowchart of FIG. 6, the switching process performed by the control unit 10 will be described. The switching process is started when the ignition switch of the own vehicle is turned on. At the time of starting the switching process, the radar device 52 is not yet operated, and thus the recognition unit 9 is performing the recognition process on the basis of an image captured by the camera module 111 (first recognition process).

First, at step S11, the control unit 10 acquires a temperature of the camera module 111 from the temperature sensor 61. The control unit 10 then determines whether or not the temperature of the camera module 111 is not more than a predetermined threshold Th (step S12). For example, the threshold Th is set to a predetermined temperature slightly lower than the operating temperature limit of the camera module 111. If it is determined that the temperature of the camera module 111 is not more than the threshold Th (YES at step S12), the control unit 10 then determines whether or not the field of view of the camera module 111 is blocked (step S13). If the control unit 10 determines that the field of view of the camera module 111 is not blocked (NO at step S13), control returns to step S11 described above, and steps S11 onward are repeated.

On the other hand, if it is determined that the field of view of the camera module 111 is blocked (YES at step S13), the control unit 10 stops the operation of the camera module 111, and at the same time starts the radar device 52 (step S14). Then, the control unit 10 switches the first recognition process to the second recognition process (step S15), and terminates the switching process. Similarly, if it is determined, at step S12, that the temperature of the camera module 111 exceeds the threshold Th (NO at step S12) as well, steps S14 onward are repeated. In other words, if the temperature of the camera module 111 exceeds the threshold Th, or if the field of view of the camera module 111 is blocked, the control unit 10 switches the first recognition process to the second recognition process.

3. Advantageous Effects (3a) The camera device 1 according to the present embodiment includes the first thermally conductive member 14 provided being in contact with the housing 114 and the windshield 2. Therefore, cooling of the camera module 111 can be accelerated, and fogging of the windshield 2 can be minimized. In other words, when the temperature of the environment external to the own vehicle is high (e.g., under strong sunlight), the temperature of the camera module 111 is prone to rise. However, in the camera device 1 according to the present embodiment, the heat of the camera module 111 is dissipated via the first thermally conductive member 14 due to the windshield 2 that has been cooled by winds while own vehicle runs. Accordingly, cooling of the camera module 111 is accelerated. Moreover, when the temperature of the environment external to the own vehicle is low (e.g. in winter), a portion of the windshield 2 in front of the lens 111a of the camera module 111 tends to be fogged. However, in the camera device 1 of the present embodiment, the air in the housing 114 is warmed by internal heat generation of the control circuit board 113 and flows toward the windshield 2 via the first thermally conductive member 14. As a result, the windshield 2 is warmed to thereby minimize fogging in a portion of the windshield 2 in front of the lens 111a of the camera module 111.

(3b) In the present embodiment, the first thermally conductive member 14 serves as a spacer for keeping a distance (prevent interference) between the windshield 2 and the housing 114. Accordingly, the camera module 111 can be mounted in a state where the lens 111a is located close to the windshield 2. In other words, if there is no spacer between the housing 114 and the windshield 2, a gap between the windshield 2 and the housing 114 is required to be increased to prevent interference therebetween caused by vibrations. In this regard, in the present embodiment, since the first thermally conductive member 14 serves as a spacer, the lens 111a can be placed closer to the windshield 2. Accordingly, the hood covering the lens barrel 111b of the camera module 111 can be downsized.

(3g) In the present embodiment, when the temperature of the camera module 111 exceeds the threshold Th or when the field of view of the camera module 111 is blocked, the first recognition process is switched to the second recognition process. Therefore, if it is difficult to perform the recognition process on the basis of an image captured by the camera module 111, the recognition process can be continued on the basis of the detection result of the radar device 52.

In the present embodiment, the camera device 1 corresponds to an example of the in-vehicle camera device, the ventilation fan 17 corresponds to an example of the ventilation unit, and the hot wire 18 corresponds to an example of the heating unit. Moreover, the radar waves in a millimeter wave band or radar waves of laser light correspond to examples of the transmission signal and the reception signal, and transmission corresponds to an example of the emission. Furthermore, the system including the camera device 1 and the radar device 52 corresponds to an example of the in-vehicle system.

4. Other Embodiments

An embodiment of the present invention has so far been described. However, the present invention should not be construed as being limited to the foregoing embodiment, but may be modified in various modes.

(4a) In the foregoing embodiment, the coefficients of thermal conductivity of the first thermally conductive member 14 and the second thermally conductive member 15 are not less than 1 W/m·K but not more than 50 W/m·K. However, the coefficients of thermal conductivity of these thermally conductive members are not limited to these values. For example, the coefficients of thermal conductivity of the thermally conductive members 14 and 15 may be greater than 50 W/m·K.

(4b) In the foregoing embodiment, the first thermally conductive member 14 and the second thermally conductive member 15 are silicon members. However, the materials of these thermally conductive members are not limited to a silicon-based material. For example, these thermally conductive members may be metal members. In the foregoing embodiment, the first thermally conductive member 14 and the second thermally conductive member 15 are sheet members. However, the modes of these thermally conductive members are not limited to the sheet members. For example, the first thermally conductive member 14 may be gel or grease, and the second thermally conductive member 15 may be a gel or grease member having adhesion, such as a thermally conductive adhesive. In the foregoing embodiment, the second thermally conductive member 15 is configured of the same material as the material of the first thermally conductive member 14. However, the second thermally conductive member 15 may be configured of a material different from the material of the first thermally conductive member 14.

(4c) In the foregoing embodiment, the first thermally conductive member 14 has a size and shape similar to those of the top face of the glass side wall 1141 of the housing 114, while the second thermally conductive member 15 has a size and shape similar to those of the top face of the bracket 12. However, the sizes and shapes of the first thermally conductive member 14 and the second thermally conductive member 15 are not limited to these sizes and shapes. For example, the second thermally conductive member 15 may have a shape smaller than, i.e. different from, that of the top face of the bracket 12. In this case, the second thermally conductive member 15 may be provided being in contact with a part of the top face of the bracket 12. Further, in this case, an adhesive may be applied to a portion of the top face of the bracket 12, with which the second thermally conductive member 15 is not contacted to thereby fix the bracket 12 to the windshield 2. In the foregoing embodiment, the first thermally conductive member 14 and the second thermally conductive member 15 are each formed of a single sheet member. However, the first and second thermally conductive member 14 and 15 may each be formed of a plurality of sheet members.

(4d) In the foregoing embodiment, the first thermally conductive member 14 is adhered to the housing 114 and the windshield 2 using the adhesion properties possessed by the first thermally conductive member 14. However, the method of adhering the first thermally conductive member 14 is not limited to this method. For example, the first thermally conductive member 14 may be adhered to the housing 114 and the windshield 2 by means of an adhesive. In the foregoing embodiment, the second thermally conductive member 15 is fixed to the bracket 12 and the windshield 2 by means of an adhesive. However, the method of fixing the second thermally conductive member 15 is not limited to this method. For example, when the second thermally conductive member 15 is configured of a material of high adhesion properties, the second thermally conductive member 15 may be fixed to the bracket 12 and the windshield 2 only using the adhesion properties possessed by the second thermally conductive member 15, without using any adhesive.

(4e) In the foregoing embodiment, the materials of the bracket 12 and the hood 13 are resins. However, the materials of the bracket 12 and the hood 13 are not limited to resins. For example, the bracket 12 and the hood 13 may be made of materials of high coefficients of thermal conductivity, such as a metal. In this case, the thermal conduction between the housing 114 and the windshield 2 may be accelerated via the second thermally conductive member 15, the bracket, and the hood. Thus, it is possible to expand heat paths, which easily conduct heat, between the housing 114 and the windshield 2.

(4f) In the foregoing embodiment, the recognition unit 9 and the control unit 10 are parts of a circuit mounted on the control circuit board 113. However, without being limited to this, for example, a single microcomputer may be configured to function both as the recognition unit 9 and the control unit 10.

(4g) In the foregoing embodiment, the camera device 1 includes the first thermally conductive member 14 and the second thermally conductive member 15. However, without being limited to this, the camera device 1 may include either one of the first and second thermally conductive members 14 and 15.

Figure 7:
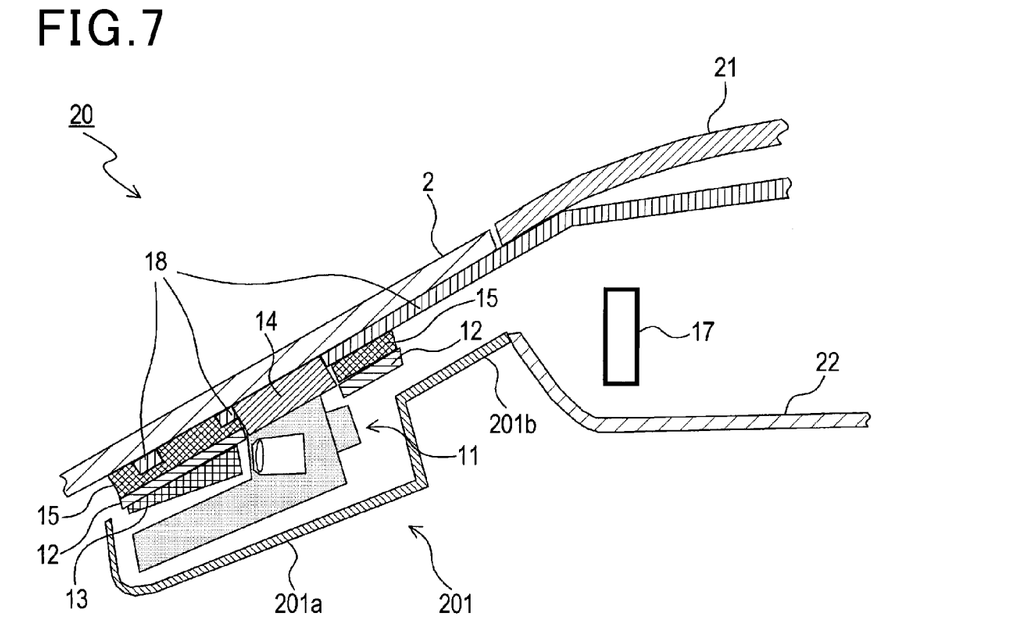
FIG. 7 is a diagram illustrating a method of installing a ventilation fan.

(4h) In the foregoing embodiment, the ventilation fan 17 is disposed in the bottom face of the cover 16. However, the position of disposing the ventilation fan 17 in the cover 16 is not limited to this position. For example, a through hole may be formed in the side face of the cover 16 and the ventilation fan 17 may be fit into the through hole. Moreover, in the foregoing embodiment, the ventilation fan 17 is disposed being fit into the through hole formed on the cover 16. However, the method of disposing the ventilation fan 17 is not limited to this. For example, the ventilation fan may be disposed as illustrated in FIG. 7. In other words, in a camera device 20 illustrated in FIG. 7, a cover 201 is used instead of the cover 16, and a ventilation fan 17 is disposed at a position different from the position in the case of the camera device 1 illustrated in FIG. 1.

The cover 201 includes a casing portion 201a and a protrusion wall 201b. The casing portion 201a is in a case-like shape having side walls and a bottom wall, with an upper part being open. The protrusion wall 201b is extended outward perpendicular to the side wall of the casing portion 201a in a part of the upper end of the casing portion 201a. The protrusion wall 201b is located rearward of an image sensor 11 in the imaging direction of a camera module 111 in a state where the image sensor 11, a bracket 12, and a hood 13 are covered with the cover 201 from below. In FIG. 7, a space is formed between a ceiling 21 of the own vehicle and a ceiling cover 22 that covers the ceiling 21 of the own vehicle from inside the car compartment (from below). The protrusion wall 201b has a tip end which is joined to an end of the ceiling cover 22. Thus, the space between the ceiling 21 of the own vehicle and the ceiling cover 22 is connected to the space inside the cover 201 to ensure the air to communicate between these two spaces. The ventilation fan 17 is disposed in the space between the ceiling 21 of the own vehicle and the ceiling cover 22 to ventilate air inside the cover 201.

(4i) In the foregoing embodiment, the ventilation fan 17 is exemplified as the ventilation unit. However, the ventilation unit is not limited to the ventilation fan 17. For example, in the camera device 20 illustrated in FIG. 7, the ventilation fan 17 may be eliminated and the ventilation fan of an air conditioner installed in the own vehicle may be used as a ventilation unit. In this case, an air conditioner duct may be disposed in the space between the ceiling 21 and the ceiling cover 22 and the air in the air conditioner duct may be caused to flow into the cover 201.

Figure 8:
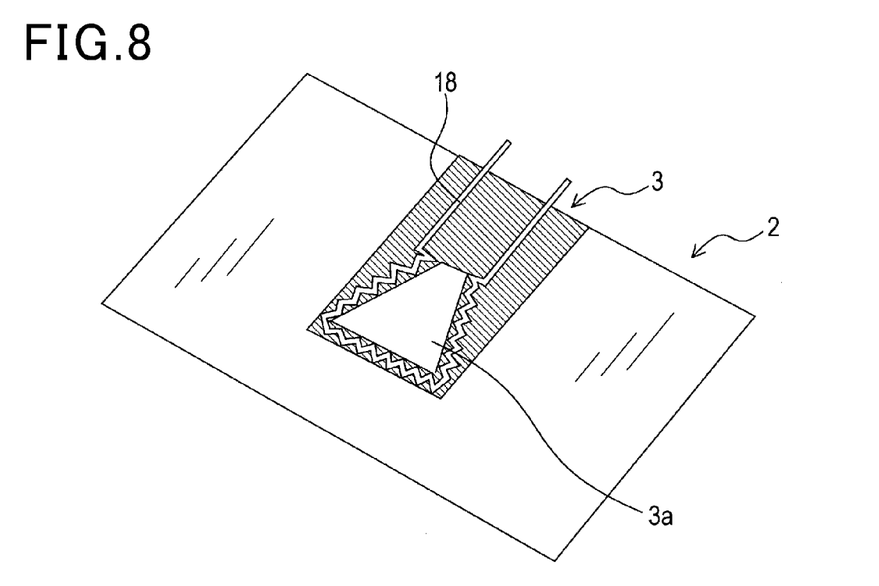
FIG. 8 is a diagram illustrating another method of routing a hot wire.

(4j) In the foregoing embodiment, the hot wire 18 is disposed with the S-shape portion 18a being laid over the notch 3a of the black ceramic 3. However, the method of disposing the hot wire 18 is not limited to this. For example, as illustrated in FIG. 8, the hot wire 18 may be disposed surrounding the notch 3a of the black ceramic 3. Moreover, in the foregoing embodiment, the hot wire 18 is exemplified as a heating unit. However, the heating unit is not limited to the hot wire 18. For example, the heating unit may be a heater.

(4k) In the embodiment, the camera device 1 includes the ventilation fan 17 and the hot wire 18. However, the camera device 1 may include either one of the ventilation fan 17 and the hot wire 18. Alternatively, the camera device 1 may include neither of the ventilation fan 17 and the hot wire 18.

Figure 9:
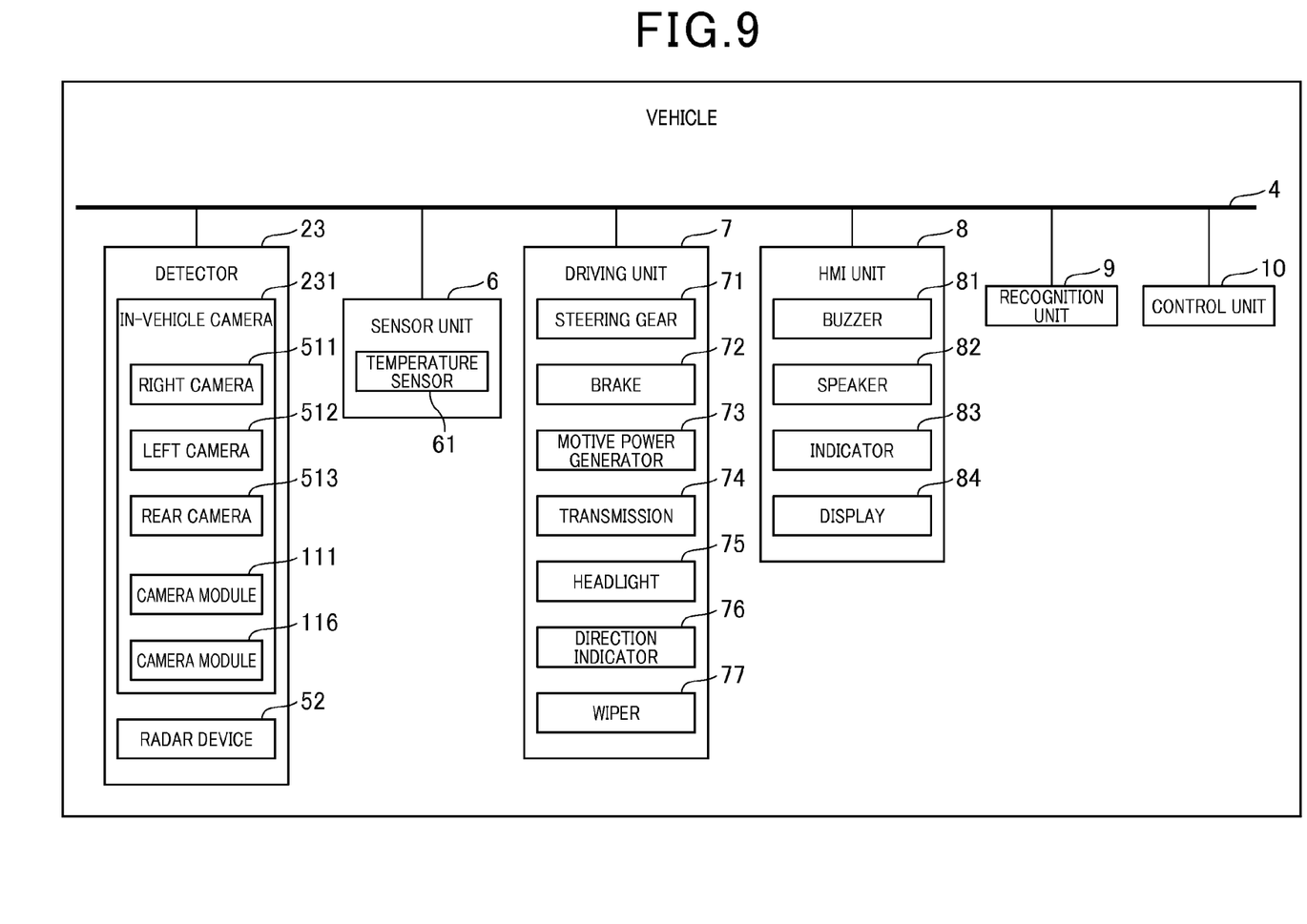
FIG. 9 is a block diagram illustrating an electrical configuration of a vehicle in the case where a camera device is a stereo camera.

(4l) In the foregoing embodiment, the camera device 1 is a monocular camera. However, the camera device is not limited to the monocular camera. For example, as illustrated in FIG. 9, the camera device may be a stereo camera. The vehicle illustrated in FIG. 9 includes a detector 23, and the detector 23 includes an in-vehicle camera 231 and a radar device 52. The radar device 52 in FIG. 9 is the same as the radar device 52 in FIG. 5. The in-vehicle camera 231 includes a right camera 511, a left camera 512, a rear camera 513, a camera module 111, and a camera module 116. In other words, the vehicle illustrated in FIG. 9 is different from the vehicle illustrated in FIG. 5 in that the camera module 116 is further provided. The camera module 116 has the same configuration as that of the camera module 111. The camera module 111 and the camera module 116 are accommodated in a single housing. The housing is arranged in the center on the upper part of the windshield (near a rearview mirror) via a bracket. The camera module 111 and the camera module 116 are disposed sandwiching, or disposed on both sides of, the center of the windshield. In the example illustrated in FIG. 9, the camera module 111 and the camera module 116 are accommodated in a single housing. However, these camera modules 111 and 116 may be separately accommodated in two respective housings. Moreover, the camera modules 111 and 116 are disposed on the upper part of the windshield so as to be located sandwiching, or located on both sides of, the center of the windshield. However, the positions of the camera modules 111 and 116 are not limited to these positions.

(4m) In the foregoing embodiment, the radar device 52 is operated in a period when the operation of the camera module 111 is stopped. However, the period when the radar device 52 is operated is not limited to this period. For example, the radar device 52 and the camera module 111 may be operated simultaneously. In this case, the recognition unit 9 may perform the recognition processes on the basis of the image captured by the camera module 111 and the detection result of the radar device 52.

(4n) In the foregoing embodiment, the first recognition process is switched to the second recognition process when one of the following condition is met, that is, a condition where the temperature of the camera module 111 exceeds the threshold Th, and a condition where the field of view of the camera module 111 is blocked. However, the conditions of switching the first recognition process to the second recognition process are not limited to these conditions. For example, the first recognition process may be switched to the second recognition process in the event that the camera module 111 has a fault.

(4o) In the foregoing embodiment, the switching process is terminated when there is a switch occurring once between first recognition process and the second recognition process. However, the switch between the first and second recognition processes may be performed a plurality of times. For example, when the temperature of the camera module 111 exceeds the threshold Th and then the first recognition process is switched to the second recognition process, the second recognition process may be switched to the first recognition process after the temperature of the camera module 111 reaches a predetermined threshold lower than the threshold Th. In this case, the camera device 1 is quickly cooled due to the cooling effect of the first and second thermally conductive members 14 and 15. Accordingly, it is possible to shorten the time taken for the switch from the second recognition process to the first recognition process (time taken for resuming the first recognition process).

(4p) In the foregoing embodiment, the camera device 1 and the radar device 52 detect the conditions ahead of the own vehicle. However, the combination of the devices to detect the conditions ahead of the own vehicle is not limited to this combination. For example, the camera device 1 and a sonar may detect the conditions ahead of the own vehicle.

(4q) In the foregoing embodiment, the recognition unit 9 can perform both the first and recognition processes. However, the recognition unit 9 may perform only the first recognition process. In this case, the own vehicle may include only the camera device 1 as a device for detecting the conditions ahead of the own vehicle.

(4r) The function of a single component in the foregoing embodiment may be divided into a plurality of components, or the functions of a plurality of components may be integrated into a single component. Moreover, at least a part of the configuration of the foregoing embodiment may be replaced by a publicly known configuration having a similar function. Further, a part of the configuration of the foregoing embodiment may be omitted. Further, at least a part of the configuration of the foregoing embodiment may be added to or replaced with another configuration of the foregoing embodiment. All modes encompassed by the technical ideas defined only by the words recited in claims should be construed as being the embodiments of the present invention.

What is claimed is:

1. An in-vehicle camera device comprising:
a camera module capturing an image of an area ahead of a vehicle;
a control circuit board performing a recognition process to recognize conditions ahead of the vehicle according to an image captured by the camera module and performing at least two vehicle control processes from among a lane departure warning process, a headlight control process, and a forward collision avoidance process on the basis of a recognition result of the recognition process;
a housing accommodating the camera module and the control circuit board;
a bracket fixing the housing to a windshield of the vehicle, the bracket having an opening permitting the housing and the windshield to face each other in a state where the housing is fixed to the windshield via the member;

a hood covering the camera module; and a first thermally conductive member provided being in contact with the housing and the windshield in the opening formed in the bracket, wherein the first thermally conductive member has a coefficient of thermal conductivity of not less than 1 W/m·K but not more than 50 W/m·K.

2. The in-vehicle camera device according to claim 1, wherein:

the housing includes a glass side wall located on the windshield side of the camera module in a state where the housing is fixed to the windshield via the bracket; and the glass side wall is formed with a cut to expose the camera module to the windshield.

3. The in-vehicle camera device according to claim 2, wherein the first thermally conductive member is provided being in contact with a region located rearward of the cut in the glass side wall in an imaging direction of the camera module.

4. The in-vehicle camera device according to claim 2, wherein the first thermally conductive member is provided being in contact with regions located sandwiching, or located on both lateral sides, of the cut in the glass side wall.

5. The in-vehicle camera device according to claim 1, further comprising a second thermally conductive member located between the bracket and the windshield, being in contact with the bracket and the windshield.

6. The in-vehicle camera device according to claim 5, wherein the second thermally conductive member has a coefficient of thermal conductivity of not less than 1 W/m·K but not more than 50 W/m·K.

7. The in-vehicle camera device according to claim 1, further comprising:

a cover covering the housing, the bracket, and the hood; and a ventilation unit ventilating an interior of the cover.

8. The in-vehicle camera device according to claim 1, further comprising a heating unit heating a portion of the windshield in front of a lens of the camera module.

9. The in-vehicle camera device according to claim 1, wherein:

the control circuit board recognizes, in the recognition process, at least one of a lane, a road shape, a road condition, a light source, a preceding vehicle, an oncoming vehicle, a stationary vehicle, a preceding pedestrian, an oncoming pedestrian, a stationary person, a motorcycle, a bicycle, an obstacle, a roadside object, a sign, a traffic signal, a traffic sign, a signboard, a tunnel, an escape area, an object that blocks a field of view of the camera module, a meteorological environment, and a building; and the control circuit board performs at least three vehicle control processes from among a lane departure warning process, a lane keeping process, a headlight control process, a crossing collision avoidance process, an intersection collision avoidance process, a forward collision avoidance process, a sign display process, a speed limit display process, a overspeed warning process, an automatic wiper process, a lane change assist process, an around view display process, an automatic parking process, an full-speed adaptive cruise control process, a blind spot warning process, a rear cross traffic warning process, a forward cross traffic warning process, an inter-vehicle distance warning process, a rear-end collision warning process, and an erroneous start prevention process.

10. The in-vehicle camera device according to claim 1, wherein the camera module is a stereo camera.

11. An in-vehicle camera device comprising:

a camera module capturing an image in an area ahead of a vehicle;

a control circuit board performing a recognition process to recognize conditions ahead of the vehicle according to an image captured by the camera module and performing at least two vehicle control processes from among a lane departure warning process, a headlight control process, and a forward collision avoidance process on the basis of a recognition result of the recognition process;

a housing accommodating the camera module and the control circuit board;

a bracket fixing the housing to the windshield of the vehicle;

a hood covering the camera module; and a thermally conductive member located between the bracket and the windshield, being in contact with the bracket and the windshield, wherein the thermally conductive member has a coefficient of thermal conductivity of not less than 1 W/m·K but not more than 50 W/m·K.

12. The in-vehicle camera device according to claim 11, further comprising:

a cover covering the housing, the bracket, and the hood; and a ventilation unit ventilating an interior of the cover.

13. The in-vehicle camera device according to claim 11, further comprising a heating unit heating a portion of the windshield in front of a lens of the camera module.

14. The in-vehicle camera device according to claim 11, wherein:

the control circuit board recognizes, in the recognition process, at least one of a lane, a road shape, a road condition, a light source, a preceding vehicle, an oncoming vehicle, a stationary vehicle, a preceding pedestrian, an oncoming pedestrian, a stationary person, a motorcycle, a bicycle, an obstacle, a roadside object, a sign, a traffic signal, a traffic sign, a signboard, a tunnel, an escape area, an object that blocks a field of view of the camera module, a meteorological environment, and a building; and the control circuit board performs at least three vehicle control processes from among a lane departure warning process, a lane keeping process, a headlight control process, a crossing collision avoidance process, an intersection collision avoidance process, a forward collision avoidance process, a sign display process, a speed limit display process, a overspeed warning process, an automatic wiper process, a lane change assist process, an around view display process, an automatic parking process, an full-speed adaptive cruise control process, a blind spot warning process, a rear cross traffic warning process, a forward cross traffic warning process, an inter-vehicle distance warning process, a rear-end collision warning process, and an erroneous start prevention process.

15. The in-vehicle camera device according to claim 11, wherein the camera module is a stereo camera.

16. An in-vehicle system comprising an in-vehicle camera device, the camera device comprising:

a camera module capturing an image of an area ahead of a vehicle;

a control circuit board performing a recognition process to recognize conditions ahead of the vehicle according to an image captured by the camera module and performing at least two vehicle control processes from among a lane departure warning process, a headlight control process, and a forward collision avoidance process on the basis of a recognition result of the recognition process;

a housing accommodating the camera module and the control circuit board;

a bracket fixing the housing to a windshield of the vehicle, the bracket having an opening permitting the housing and the windshield to face each other in a state where the housing is fixed to the windshield via the member;

a hood covering the camera module; and a first thermally conductive member provided being in contact with the housing and the windshield in the opening formed in the bracket, wherein the system further comprises a radar device radiating a transmission signal ahead of the vehicle, receiving the transmission signal reflected from an object ahead of the vehicle as a reception signal, and detecting the object from the transmission signal and the reception signal, and the control circuit board is able to perform, as the recognition process, a first recognition process based on the image captured by the camera module and a second recognition process based on a detection result derived from the radar device, and switches between the first recognition process and the second recognition process when a predetermined condition is met.

17. An in-vehicle system comprising the in-vehicle camera device, the camera device comprising:

a camera module capturing an image in an area ahead of a vehicle;

a control circuit board performing a recognition process to recognize conditions ahead of the vehicle according to an image captured by the camera module and performing at least two vehicle control processes from among a lane departure warning process, a headlight control process, and a forward collision avoidance process on the basis of a recognition result of the recognition process;

a housing accommodating the camera module and the control circuit board;

a bracket fixing the housing to the windshield of the vehicle;

a hood covering the camera module; and a thermally conductive member located between the bracket and the windshield, being in contact with the bracket and the windshield, wherein the system further comprises a radar device radiating a transmission signal ahead of the vehicle, receiving the transmission signal reflected from an object ahead of the vehicle as a reception signal, and detecting the object from the transmission signal and the reception signal, and the control circuit board is able to perform, as the recognition process, a first recognition process based on the image captured by the camera module and a second recognition process based on a detection result derived from the radar device, and switches between the first recognition process and the second recognition process when a predetermined condition is met.

* * * * *